(12) United States Patent
John

(10) Patent No.: US 8,972,456 B2
(45) Date of Patent: Mar. 3, 2015

(54) ANALYZING SOFTWARE-USAGE INFORMATION

(75) Inventor: Peter John, Neckargemuend (DE)

(73) Assignee: SAP SE, Walldorf (DE)

( * ) Notice: Subject to any disclaimer, the term of this patent is extended or adjusted under 35 U.S.C. 154(b) by 310 days.

(21) Appl. No.: 13/180,569

(22) Filed: Jul. 12, 2011

(65) Prior Publication Data

US 2013/0018888 A1    Jan. 17, 2013

(51) Int. Cl.
*G06F 7/00* (2006.01)
*G06Q 30/02* (2012.01)

(52) U.S. Cl.
CPC .................................. *G06Q 30/02* (2013.01)
USPC ............................. 707/802; 717/120; 717/127

(58) Field of Classification Search
USPC .................................. 707/802; 717/120, 127
See application file for complete search history.

(56) References Cited

U.S. PATENT DOCUMENTS

| | | | |
|---|---|---|---|
| 5,499,340 A * | 3/1996 | Barritz | 714/47.1 |
| 6,075,862 A * | 6/2000 | Yoshida et al. | 380/28 |
| 6,173,446 B1 * | 1/2001 | Khan et al. | 717/127 |
| 6,996,807 B1 * | 2/2006 | Vardi et al. | 717/127 |
| 7,730,480 B2 * | 6/2010 | Isaacson | 717/174 |
| 2006/0242638 A1 * | 10/2006 | Lew et al. | 717/168 |
| 2007/0061447 A1 * | 3/2007 | Flores et al. | 709/224 |

* cited by examiner

*Primary Examiner* — Cheyne D Ly

(57) ABSTRACT

Various embodiments of systems and methods for analyzing software-usage information are described herein. Traffic numbers are obtained from data stored in a database using measurement objects that are associated with one or more keys. The measurement objects output the traffic numbers and the one or more keys are related to elements of the data. Identifiers and categories are assigned to the measurement objects. The categories represent attributes of a software product. A data structure comprising the identifiers, the traffic numbers, and the categories is generated and stored. The stored data structure and a header comprising one or more fields are used to generate a report.

20 Claims, 6 Drawing Sheets

200

| IDENTIFIER 202 | CATEGORY 204 | TRAFFIC NUMBER 206 |
|---|---|---|
| BI_VERI_C | E | 0 |
| BI_VERI_C*700 | R | 1 |
| BI_VERI_LOCKED | E | 0 |
| BI_VERI_LOCKED*700 | R | 1 |
| BWAUTH7X | F | 1 |
| BW_LOCKED_BRA | E | 0 |
| BW_LOCKED_BRA*711 | R | 1 |
| PI_BASIS | E | 0 |
| PI_BASIS*730 | R | 1 |
| ABA | E | 0 |
| ABA*730 | R | 1 |
| SAP_BASIS | E | 0 |
| SAP_BASIS*730 | R | 1 |
| SAP_BW | E | 0 |
| SAP_BW*730 208 | R | 1 |
| SAP_BW_BIA_INST | C | 1 |
| SAP_BW_FE_ANA3X | F | 232 |
| SAP_BW_FE_WEB3X | F | 16.553 |
| SAP_BW_IP_ALVL 210 | F | 207 |
| SAP_BW_JAVA_WEB | F | 112 |
| SAP_BW_POLESTAR | F | 116 |
| SPECIALS_PORTAL | C | 1 |

| IDENTIFIER 202 | CATEGORY 204 | TRAFFIC NUMBER 206 |
|---|---|---|
| BI_VERI_C | E | 0 |
| BI_VERI_C*700 | R | 1 |
| BI_VERI_LOCKED | E | 0 |
| BI_VERI_LOCKED*700 | R | 1 |
| BWAUTH7X | F | 1 |
| BW_LOCKED_BRA | E | 0 |
| BW_LOCKED_BRA*711 | R | 1 |
| PI_BASIS | E | 0 |
| PI_BASIS*730 | R | 1 |
| ABA | E | 0 |
| ABA*730 | R | 1 |
| SAP_BASIS | E | 0 |
| SAP_BASIS*730 | R | 1 |
| SAP_BW | E | 0 |
| SAP_BW*730 208 | R | 1 |
| SAP_BW_BIA_INST | C | 1 |
| SAP_BW_FE_ANA3X | F | 232 |
| SAP_BW_FE_WEB3X | F | 16.553 |
| SAP_BW_IP_ALVL 210 | F | 207 |
| SAP_BW_JAVA_WEB | F | 112 |
| SAP_BW_POLESTAR | F | 116 |
| SPECIALS_PORTAL | C | 1 |

REPORTING TOOL

| CAL YEAR/QUARTER 402 |
|---|
| CALENDAR DAY 404 |
| CUSTOMER 406 |
| MEASUREMENT OBJECT ID 408 |
| CATEGORY 410 |
| USAGE WEIGHT 412 |
| CALENDAR MONTH |
| CALENDAR WEEK |

| CALENDAR YEAR/ QUARTER 422 | CALENDAR DAY 424 | CUSTOMER NAME 426 | MEASUREMENT OBJECT IDENTIFIER 416 | CATEGORY 418 | TRAFFIC NUMBER 420 |
|---|---|---|---|---|---|
| Q3 2010 | 30.09.2010 | SD7 | TEST | F | 250 |
| Q4 2010 | 24.11.2010 | SD7 | SAP_BW_BIA_INST | F | 25 |
| | | | TEST | F | 0 |
| | | | TOTAL | | 25 |
| | 06.12.2010 | SD7 | SAP_BW_BIA_INST | F | 42 |
| | | | TEST | F | 0 |
| | | | XYZ | F | 200 |
| | | | TOTAL | | 242 |
| Q1 2011 | 01.02.2011 | SD7 | BWA | F | 33 |
| | | | CI_GS 06 | F | 67 |
| | | | SAP_HR&604 | R | 15 |
| | | | SAP_HRRXX&604 | R | 60 |
| | | | TOTAL | | 175 |
| | 03.03.2011 | SD7 | BWA | F | 52 |
| | | | CI_GS 08 | F | 69 |
| | | | ... | ... | ... |

| MEASUREMENT OBJECT | CUSTOMER NAME | WEIGHT |
|---|---|---|
| MO1 | ABJ | H |
| MO2 | BTH | M |
| MO3 | XYZ | L |
| MO4 | ABJ | L |
| MO5 | XYZ | H |
| MO6 | MYR | L |
| MO7 | BTH | L |
| MO7 | ABJ | H |
| MO8 | XYZ | L |
| MO8 | ABJ | M |
| MO9 | BTH | L |

REPORTING TOOL
- CUSTOMER
- MEASUREMENT OBJECT
- CATEGORY
- WEIGHT

ANALYZING SOFTWARE-USAGE INFORMATION

FIELD

The field relates generally to methods and systems for obtaining information from customers. More particularly, the field relates to methods and systems for obtaining software-usage information from customers.

BACKGROUND

A software product includes several features and attributes. After purchasing software, the extent of usage of a software product depends on many factors including a customer's needs and requirements. Customers may not use a software product to its full capacity or extent. Some features of a software product may be widely used while some others may not be used at all. Information about the extent of usage of a software product can be valuable to software vendors. Software vendors can use such information to analyze their product offerings and to better understand specific customer needs.

Depending on the type of software product, some software vendors may be able to receive usage data or user logs from their customers. Such data received from customers can provide information about system status, performance, and configuration. However, content and format of such data received from customers is typically not useful to extract information about the extent of usage of a software product. Also, data that is typically received from customer systems can be vast and may not have the required level of granularity and detail to analyze feature-level usage of a software product.

It would therefore be desirable to obtain software-usage information that is suitable for analyzing the extent of software usage.

SUMMARY

Various embodiments of systems and methods for analyzing software-usage information are described herein. Traffic numbers are obtained from data stored in a database using measurement objects that are associated with one or more keys. The measurement objects output the traffic numbers and the one or more keys are related to elements of the data. Identifiers and categories are assigned to the measurement objects. The categories represent attributes of a software product. A data structure comprising the identifiers, the traffic numbers, and the categories is generated and stored. The stored data structure and a header comprising one or more fields are used to generate a report.

These and other benefits and features of embodiments of the invention will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

FIG. 4 is a block diagram illustrating an embodiment of a report.

FIG. 5 is a block diagram illustrating another embodiment of the report.

DETAILED DESCRIPTION

Embodiments of techniques for analyzing software-usage information are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

Figure 1:
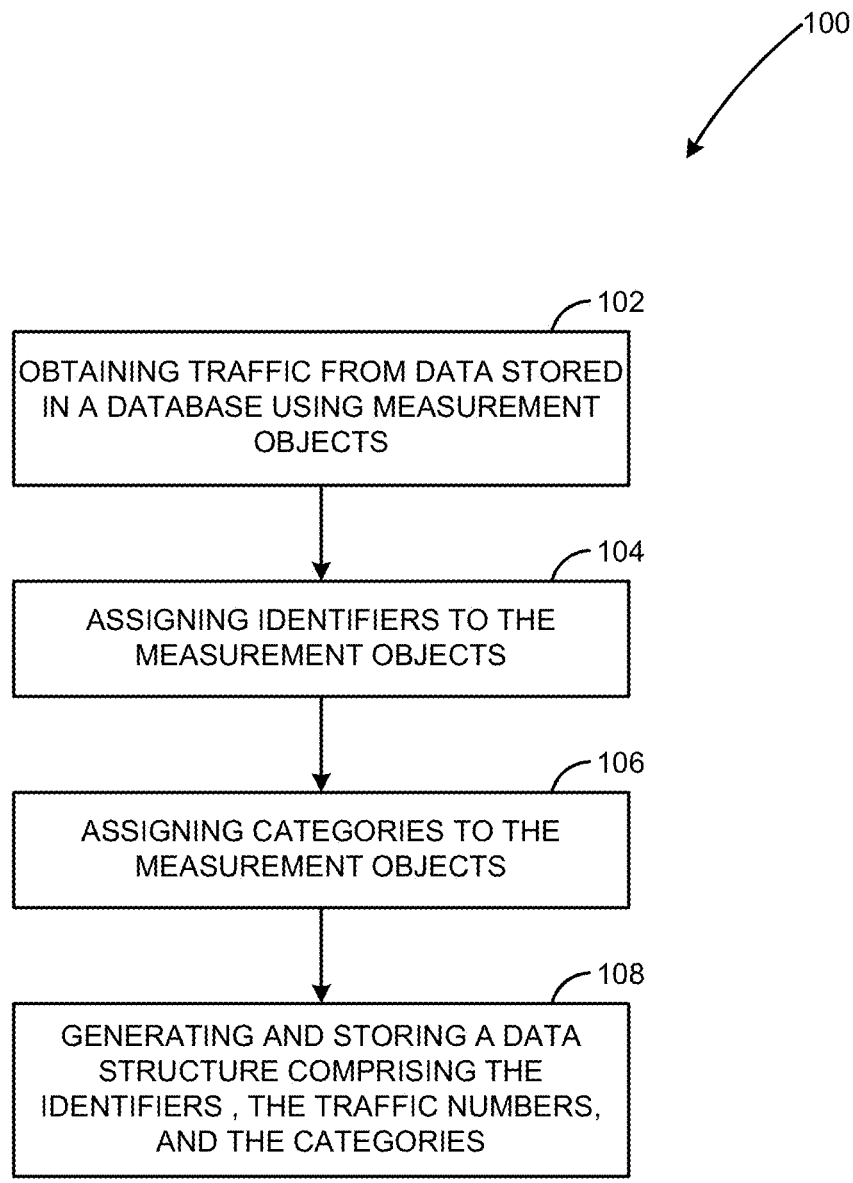
FIG. 1 illustrates a block diagram of a method for analyzing software-usage information, according to one embodiment.

FIG. 1 illustrates a method 100 for analyzing software-usage information. Some software systems or products are required to be installed in a database at a customer's location. Examples of such software systems include Enterprise Resource Planning (ERP) systems and Business Intelligence systems. Once installed, several users can use the software product. A user, depending on the role and the responsibility, can access some features of the software product and perform relevant operations. For example, in the context of an enterprise software product, a user can generate reports, configure or change settings in an ERP module, access data, etc. Typically, data about usage of a software product is collected as logs or traces and stored in a database at customer's end. Such data can include log files, tables, metadata, master data, transactional data, etc.

At 102, traffic numbers are obtained from data that is stored in a customer's database. Measurement objects are used to obtain the traffic numbers. A measurement object measures or counts some parameters based on at least one key and outputs a traffic number that is indicative of the measurement. These parameters are about usage of a software product. The measurement can also be referred to as a tracker. The measurement object includes computer-readable statements that include a reference to at least one key. In one embodiment, the measurement object can be a code snippet representing a select statement or a program. Consider the below example of a table that is stored in a customer's database to data about usage of a software product:

| OBJECT | OBJ_NAME | AUTHOR |
| --- | --- | --- |
| FUGR | ZCUP | JOHNPE |
| FUGR | ZDISTRIBUTE | JOHNPE |
| INTF | ZIFSHAPE | JAMDGN |
| INTF | ZIWCI_WDC_ALRT_DELT | JAMDGN |
| INTF | ZIWCI_WD_COMP | JAMDGN |
| INTF | ZIWCI_WD_COMP_2 | JAMDGN |
| INTF | ZIWCI_WD_INTF_1 | JAMDGN |
| INTF | ZIWCI_WD_INTF_2 | JAMDGN |
| INTF | ZIWCI_WD_RECONFIGUR | JAMDGN |
| INTF | ZIWCI_WD_TEST_MO_VI | JAMDGN |
| PROG | ZAUTOUPDATEJOB | JOHNPE |
| PROG | ZCOPYFILEFROMTO | JOHNPE |
| PROG | ZCREATESNIPPET | JOHNPE |
| PROG | ZCRM_ORDER_DELETE | JIANGWE |
| PROG | ZCUTEMPLATE | JOHNPE |
| PROG | ZEXTRACTORTEST | JOHNPE |
| PROG | ZMKTEST | JONASJ |
| PROG | ZMKTEST2 | JONASJ |
| PROG | ZMKTEST23 | JONASJ |
| PROG | ZMK_TEST_CONTEXT_CO | JONASJ |
| PROG | ZPHTTP_GET | JOHNPE |
| PROG | ZPJCL_HTTP_CLIENT | JOHNPE |
| PROG | ZVJ_ATTACH_ACMONOBJ | JAMDGN |
| PROG | ZPJEXTRACTORJOB | JOHNPE |
| PROG | ZRESET_AU_DEMO | JOHNPE |
| ... | ... | ... |

The table stores a list of objects and respective authors of the objects. The table can have a name such as "OBJ_Table." Similarly, various other tables can be stored in a customer's database. Consider a parameter to be measured is about "how many objects have names starting with 'Z' and have 'JOHNPE' as the author in OBJ_Table." The following measurement object (in open SQL syntax) can be used to measure this parameter:

```
SELECT COUNT(*) from OBJ_Table INTO traffic
WHERE OBJECT = PROG
AND   AUTHOR = JOHNPE
AND   OBJ_NAME LIKE Z%
```

The above measurement object uses the following keys: PROG, JOHNPE, and Z % to measure the parameter. These keys are related to the elements of the table. For example, the key "PROG" is about a type of an object in object column of the table, the key "JOHNPE" is about an author in the author column, and the key "Z %" represents an object name that starts with "Z" in the object name column. When the instructions of the measurement object are executed, the measurement object searches the OBJ_Table and starts counting the object names that start with "Z" which belong to "PROG" and have the "JOHNPE" as the author. At every occurrence of the parameter, the traffic number is incremented by "1." Finally, the measurement object obtains a traffic number (9) which indicates the number of object names starting with "Z" which belong to "PROG" and have the "JOHNPE" as the author.

The above-described measurement object is a SELECT tracker. Another example of a measurement object is presented below:

```
SELECT switch from SWFRMWRK_Table INTO local_variable
WHERE feature = feature_of_interest
IF local_variable = 'X' "True"
// Switched on. Traffic is now counted//
   SELECT COUNT (*) from USAGE_TABLE INTO traffic
       WHERE feature = feature_of_interest
ELSE
   Traffic = −1.
// Switched off//
ENDIF
```

The above measurement object is a switch tracker. The switch tracker counts the "feature_of_interest" (a key) when the local variable is "X." At each occurrence of the key when the local variable is equal to "X," the traffic number is incremented by "1." If the local variable is not equal to "X," the traffic number is outputted as "−1." The traffic number can be an integer and depends on the type of the tracker and the declarations made in the tracker.

At 104, an identifier is assigned to each measurement object. An identifier can be any combination of alphabets, numbers, and special characters. The identifiers are predefined for each measurement object by a software vendor and are assigned to the respective measurement objects. Identifiers can be defined such that their corresponding measurement objects can be easily recognized. For example, if a measurement object measures usage of an object related to a specific software product, the identifier can be an acronym of that software product. Consider the previous example of the measurement object for measuring the parameter "how many programs have names starting with 'Z' and have 'JOHNPE' as the author OBJ_Table." If OBJ_Table stores data specific to usage of a software product such as, for example, SAP® Business Information Warehouse 7.30 (an offering by SAP® AG, Germany), then "SAP_BW_730" can be defined as an identifier for the measurement object. As another example, if a measurement object measures a parameter related to usage data of SAP® BUSINESSOBJECTS Explorer (a product of SAP® AG, Germany), then "SAP_BW_EXPLORER" or "BW_EXPLORER" can be defined as an identifier for that measurement object. It should be noted that the identifiers are discussed as only examples. The structure of the identifiers can vary depending on the software product and the vendor of the software product.

At 106, categories are assigned to the measurement objects. A category represents an attribute of a software product. Attribute can include, for example, a feature of the software product, a component or a sub-component of the software product, a module or a sub-module of the software product, and a platform associated with the software product. These categories can be defined for a software product by the vendor of the software product. For example, a category "Release (R)" can be assigned to a measurement object (e.g., SAP_BW_730) if the measurement object measures a usage parameter of a particular release of software product (SAP® Business Information Warehouse 7.30). If a measurement object measures a usage parameter of a feature of a software product, then a category "Feature (F)" can be assigned to that measurement object.

Figure 2:
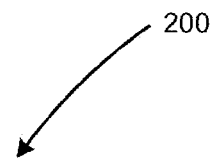
FIG. 2 illustrates a block diagram of a data structure, according to one embodiment.

At 110, a data structure is generated. The data structure includes the identifiers of the measurement objects, the traffic numbers obtained by the measurement objects, and the categories of the measurement objects is generated. According to one embodiment, the data structure is stored in a database at customer's end. An embodiment of such data structure is shown in FIG. 2. Referring to FIG. 2, the data structure 200 comprises a table with three columns, namely, an identifier column 202, a category column 204, and a traffic number column 206. The identifiers are stored in the identifier column 202. Categories are stored in the category column 204 corresponding to their respective identifiers. Traffic numbers are stored in the traffic number column 204 corresponding to their respective identifiers. For example, the identifier "SAP_BW_730" 208 belongs to a category "R" and has a traffic number "1." Similarly, the identifier "SAP_BW_I-P_ALVL" 210 belongs to a category "F" and has a traffic number "207."

In one embodiment, weights can be determined for the traffic numbers. The weights can be label-based weights such as High (H), Low (L), and Medium (M). For example, for a traffic number of "100" (or more), a weight "H" can be assigned. Similarly, a weight "M" can be assigned to traffic numbers between "20" and "80" and a weight "L" can be assigned to traffic numbers between below "20."

Figure 3:
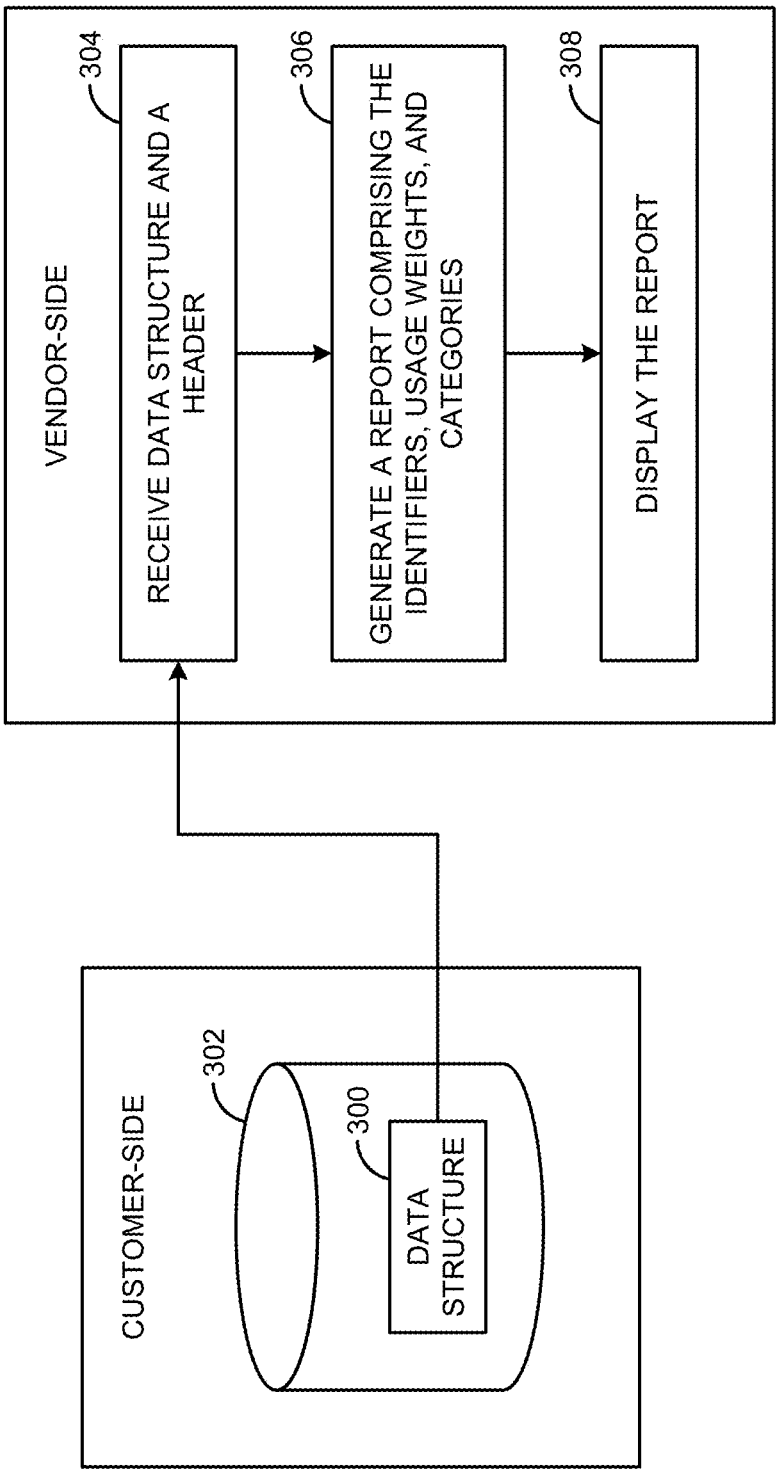
FIG. 3 is a block diagram illustrating the method for analyzing software usage information from customer and vendor perspectives, according to one embodiment.

Referring to FIG. 3, the data structure 300 is generated and stored in a database 302 at a customer's side. As described previously, the data structure 302 includes identifiers of the measurement objects and categories and traffic numbers. At 304, the data structure is received at a vendor's side for further analysis. In one embodiment, a header is received along with the data structure. The header can include customer details and a time stamp. Customer details can include any combination of customer name, customer identifier, license number of the software product, and system name. A time stamp can include calendar day and time at which the data structure is sent to the vendor. In another embodiment, the time stamp includes calendar day and time at which the traffic is determined. In one embodiment, each row of the data structure can include a time at which the traffic is determined.

A report is generated at 306. A user on vendor-side can be provided with various options to generate the report. The report is generated based on the user selections on a user interface. An embodiment of the report is explained in reference to FIG. 4. The report mainly includes an arrangement of the identifiers, the traffic numbers, and categories with respect to one or more of the header fields. A user can select a customer parameter (a header field) to be displayed in the report. If a customer parameter is selected, then the identifiers, traffic numbers, and categories are grouped based on customer details such as customer ID. The user can also select a time parameter (a header field) to be displayed in the report. Following user selection, the report is generated and displayed on a user interface at 308. A user from vendor-side can then view the report to analyze the extent of usage of software products developed by the vendor.

The vendor may need to have permission from a customer to receive the data structure from the customer. In one embodiment, this permission can be granted by way of an agreement between the vendor and the customer. In another embodiment, the customer can be informed before sending the data structure to the vendor. A responsible user from the customer-side such as a system administrator can be informed that the data structure will be transmitted upon approval. In one embodiment, a pop-up window can be provided to a customer-side user requesting for approval of data transfer to the vendor. The customer-side user can then accept or reject the data transfer. The data structure can be sent to the vendor after approval by the customer-side user.

FIG. 4 illustrates an embodiment of a report. In one embodiment, a report generation application can be used to generate the report. The report generation application can be integrated with or can be part of an analytic application or a reporting tool. An example of a reporting tool is SAP® Business Explorer (BEx) that is used to work with data in a business warehouse (BW) or a database. The report generation application works with the data structure that is received and stored in the database at the vendor side. A user can select various options on a user interface 400 of the report generation application to generate various reports. For example, the user can select time parameter such as calendar year/quarter 402 and calendar day 404 and a customer parameter 406 such as customer name to be included in the report. The calendar year/quarter 402, calendar day 404, and customer parameter 406 are part of header fields that are received along with the data structure. The user can also select measurement object identifier 408, category 410, and traffic number 412 to be included in the report. In the user interface 400, calendar year/quarter 402, calendar day 404, customer parameter 406, measurement object identifier 408, category 410, and traffic number 412 are shown as selected.

A report 414 is generated in response to user selection. In one embodiment, the report 414 includes an identifier column 416, a category column 418, a traffic number column 420, a calendar year/quarter column 422, a calendar day column 424, and a customer name column 426, reflecting user selections. The identifiers, the categories, and the traffic numbers are arranged with respect to the header fields, namely, the customer parameter, calendar day, and calendar year/quarter that are selected by the user. As an example, the report shows that the measurement object represented by the identifier "SAP_BW_BIA_INST" has a traffic number "25" for the customer name "SD7" and for the calendar day "24.11.2010," which is a time stamp. The report also shows that identifier "SAP_BW_BIA_INST" belongs to the category "F." The identifier "SAP_BW_BIA_INST" corresponds to the measurement object representing "SAP Business Warehouse Business Intelligence Accelerator Installation." It is the vendor that defines these identifiers. Therefore, a user on vendor side has the knowledge about which measurement object an identifier corresponds to. The user can interpret that the identifier "SAP_BW_BIA_INST" corresponds to the measurement object "SAP Business Warehouse Business Intelligence Accelerator Installation."

FIG. 5 illustrates another embodiment of a report 500. In this embodiment, label-based usage weights are used instead of traffic numbers. The label-based weights include a High usage (H), a Medium usage (M), and a Low usage (L). The report 500 includes a measurement object column 502, a customer name column 504, and a weight column 506. By assigning weights, the customers can be easily compared on the basis of their extent of usage of a software product. For example, a weight "H" for a customer implies that the customer is using a software product extensively.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 6:
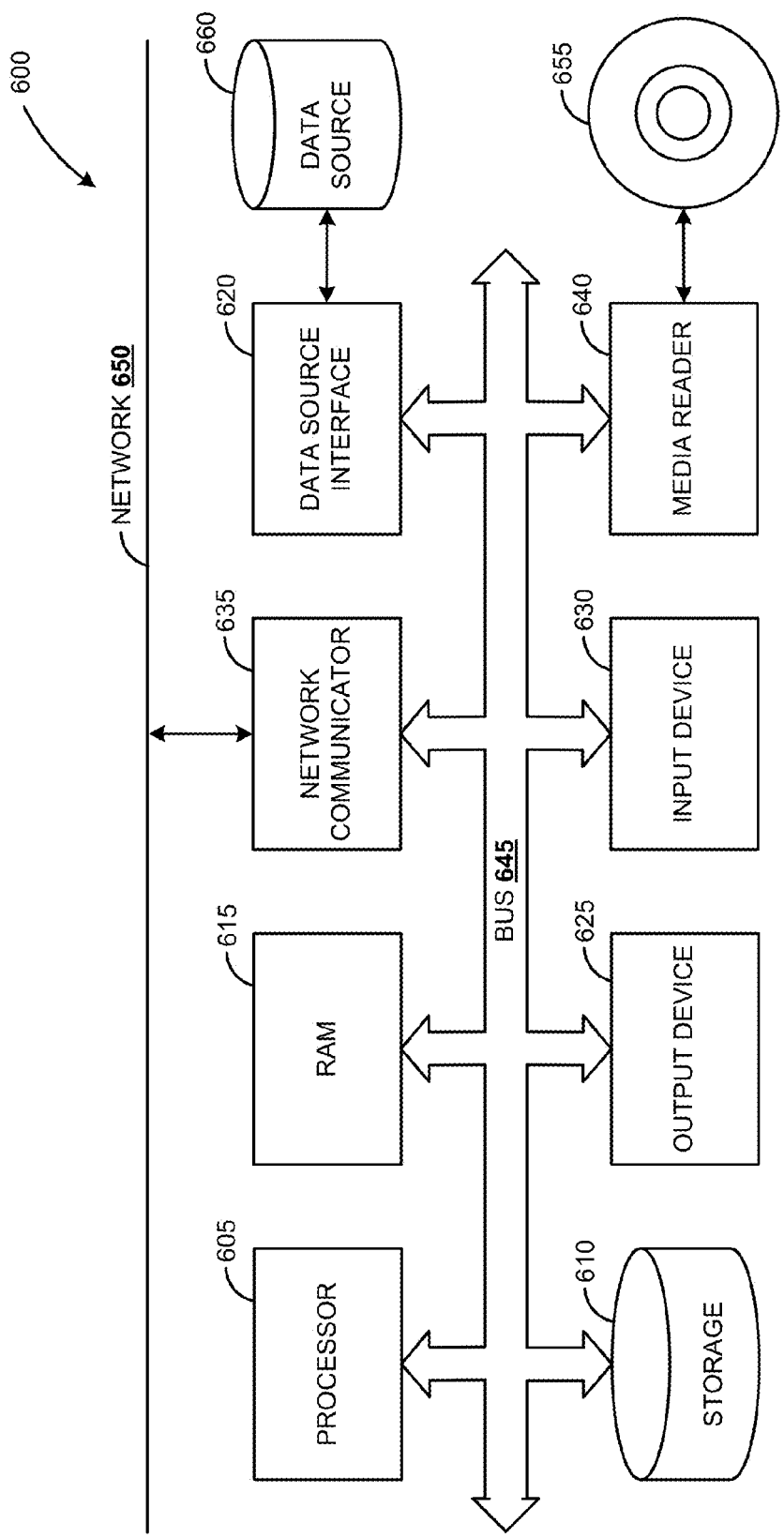
FIG. 6 is a block diagram of an exemplary computer system according to one embodiment.

FIG. 6 is a block diagram of an exemplary computer system 600. The computer system 600 includes a processor 605 that executes software instructions or code stored on a computer readable storage medium 655 to perform the above-illustrated methods of the invention. The computer system 600 includes a media reader 640 to read the instructions from the computer readable storage medium 655 and store the instructions in storage 610 or in random access memory (RAM) 615. The storage 610 provides a large space for keeping static data where at least some instructions could be stored for later execution. The stored instructions may be further compiled to generate other representations of the instructions and dynamically stored in the RAM 615. The processor 605 reads instructions from the RAM 615 and performs actions as instructed. According to one embodiment of the invention, the computer system 600 further includes an output device 625 (e.g., a display) to provide at least some of the results of the execution as output including, but not limited to, visual information to users and an input device 630 to provide a user or another device with means for entering data and/or otherwise interact with the computer system 600. Each of these output devices 625 and input devices 630 could be joined by one or more additional peripherals to further expand the capabilities of the computer system 600. A network communicator 635 may be provided to connect the computer system 600 to a network 650 and in turn to other devices connected to the network 650 including other clients, servers, data stores, and interfaces, for instance. The modules of the computer system 600 are interconnected via a bus 645. Computer system 600 includes a data source interface 620 to access data source 660. The data source 660 can be accessed via one or more abstraction layers implemented in hardware or software. For example, the data source 660 may be accessed by network 650. In some embodiments the data source 660 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Data-Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. A computer-implemented method for analyzing software usage information, the method comprising:
   obtaining traffic numbers from data stored in a database using measurement objects that are associated with one or more keys, wherein the measurement objects output the traffic numbers and the one or more keys are related to elements of the data;
   assigning identifiers to the measurement objects;
   assigning categories to the measurement objects, wherein the categories represent attributes of a software product; and
   generating and storing a data structure comprising the identifiers, the traffic numbers, and the categories in respective fields.

2. The method of claim 1, further comprising:
   determining weights for the traffic numbers; and generating and storing the data structure comprising the identifiers, the traffic numbers, the categories, and the weights in respective fields.

3. The method of claim 2, wherein the weight comprises label-based weights.

4. The method of claim 2, further comprising:
receiving the data structure and a header comprising one or more fields, wherein the header fields comprise one or more customer details and a time stamp; and
generating a report comprising the identifiers, the weights, and the categories with respect to the header fields.

5. The method of claim 1, wherein the data comprises trace data stored in the database.

6. The method of claim 1, wherein the attributes of the software product comprise a feature, a component, and a version of the software product.

7. A computer system, comprising:
a computer memory to store program code; and
a processor to execute the program code to:
obtain traffic numbers from data stored in a database using measurement objects that are associated with one or more keys, wherein the measurement objects output the traffic numbers and the one or more keys are related to elements of the data;
assign identifiers to the measurement objects;
assign categories to the measurement objects, wherein the categories represent attributes of a software product; and
generate and storing a data structure comprising the identifiers, the traffic numbers, and the categories in respective fields.

8. The system of claim 7, wherein the processor further executes the program code to:
determine weights for the traffic numbers; and
generate and storing the data structure comprising the identifiers, the traffic numbers, the categories, and the weights in respective fields.

9. The system of claim 8, wherein the weights comprises label-based usage weights.

10. The system of claim 8, wherein the processor further executes the program code to:
transfer the data structure and a header comprising one or more fields for generating a report, wherein the header fields comprise one or more customer details and a time stamp.

11. The system of claim 7, wherein the data comprises trace data stored in the database.

12. The system of claim 7, wherein the attributes of the software product comprise a feature, a component, and a version of the software product.

13. The system of claim 7, wherein the measurement objects measure parameters about usage of the software product and output the traffic numbers indicative of the measurement of the parameters.

14. The method of claim 1, wherein the measurement objects measure parameters about usage of the software product and output the traffic numbers indicative of the measurement of the parameters.

15. An article of manufacture including a non-transitory computer readable storage medium to tangibly store instructions, which when executed by a computer, cause the computer to:
obtain traffic numbers from data stored in a database using measurement objects that are associated with one or more keys, wherein the measurement objects measure parameters about usage of a software product and output the traffic numbers indicative of the measurement of the parameters and the one or more keys are related to elements of the data;
assign identifiers to the measurement objects;
assign categories to the measurement objects, wherein the categories represent attributes of a software product; and
generate and storing a data structure comprising the identifiers, the traffic numbers, and the categories in respective fields.

16. The article of manufacture of claim 15, further comprising instructions which when executed by the computer, cause the computer to:
determine weights for the traffic numbers; and
generate and storing the data structure comprising the identifiers, the traffic numbers, the categories, and the weights in respective fields.

17. The article of manufacture of claim 16, wherein the weights comprises label-based usage weights.

18. The article of manufacture of claim 16, further comprising instructions which when executed by the computer, cause the computer to:
transfer the data structure and a header comprising one or more fields for generating a report, wherein the header fields comprise one or more customer details and a time stamp.

19. The article of manufacture of claim 15, wherein the data comprises trace data stored in the database.

20. The article of manufacture of claim 15, wherein the attributes of the software product comprise a feature, a component, and a version of the software product.

* * * * *